US012637353B2

(12) United States Patent
Rameshni et al.

(10) Patent No.: US 12,637,353 B2
(45) Date of Patent: May 26, 2026

(54) INTEGRATED SULFUR RECOVERY AND HYDROGEN PRODUCTION PROCESS

(71) Applicants: Mahin Rameshni, Monrovia, CA (US); Stephen L. Santo, La Crescenta, CA (US)

(72) Inventors: Mahin Rameshni, Monrovia, CA (US); Stephen L. Santo, La Crescenta, CA (US)

( * ) Notice: Subject to any disclaimer, the term of this patent is extended or adjusted under 35 U.S.C. 154(b) by 583 days.

(21) Appl. No.: 17/726,328

(22) Filed: Apr. 21, 2022

(65) Prior Publication Data

US 2023/0339753 A1 Oct. 26, 2023

(51) Int. Cl.
| | |
|---|---|
| *C01B 17/04* | (2006.01) |
| *B01J 27/08* | (2006.01) |
| *B01J 38/00* | (2006.01) |
| *C01B 3/326* | (2026.01) |
| *C01B 17/60* | (2006.01) |
| *C01B 17/78* | (2006.01) |
| *C01B 17/88* | (2006.01) |

(52) U.S. Cl.
CPC ............. *C01B 17/78* (2013.01); *B01J 27/08* (2013.01); *B01J 38/00* (2013.01); *C01B 3/326* (2013.01); *C01B 17/60* (2013.01); *C01B 17/88* (2013.01); *C01B 2203/0227* (2013.01)

(58) Field of Classification Search
USPC ....................................................... 423/522
See application file for complete search history.

(56) References Cited

U.S. PATENT DOCUMENTS 11,548,784 B1 * 1/2023 Raynel ............... B01D 53/8603

FOREIGN PATENT DOCUMENTS

| | | | | |
|---|---|---|---|---|
| CN | 1785796 | * | 6/2006 | |
| CN | 101618863 | * | 1/2010 | |
| CN | 101618863 A | * | 1/2010 | |
| CN | 108358176 | * | 8/2018 | |
| CN | 109573959 | * | 4/2019 | |
| CN | 209193553 | * | 8/2019 | |
| CN | 209193553 U | * | 8/2019 | |
| CN | 110844889 | * | 2/2020 | |
| CN | 111874872 | * | 11/2020 | |
| CS | 209946 | * | 12/1981 | |
| EP | 0002737 | * | 12/1978 | |
| EP | 0002737 A1 | * | 7/1979 | ............. C01B 17/74 |
| EP | 2507166 | * | 10/2017 | |

* cited by examiner

*Primary Examiner* — Sheng H Davis

(57) ABSTRACT

A process for producing hydrogen, sulfuric acid, and sulfur dioxide (SO2) utilizes the Sulfur-Iodine (S—I) thermochemical cycle. Acid gases, typically processed in sulfur recovery units, are combusted in an acid gas burner with air, enriched air, or oxygen, without fuel gas, to produce SO2. Iodine facilitates hydrogen production.

A portion or all of the acid gases are directed to the burner in accordance with the present invention. The process reduces SO2 and CO2 emissions, with produced SO2 used for fertilizer production and CO2 sent for removal or CO2 liquefaction.

The generated hydrogen supplies facility needs, such as hydrotreaters, reducing external imports and operating costs.

20 Claims, 5 Drawing Sheets

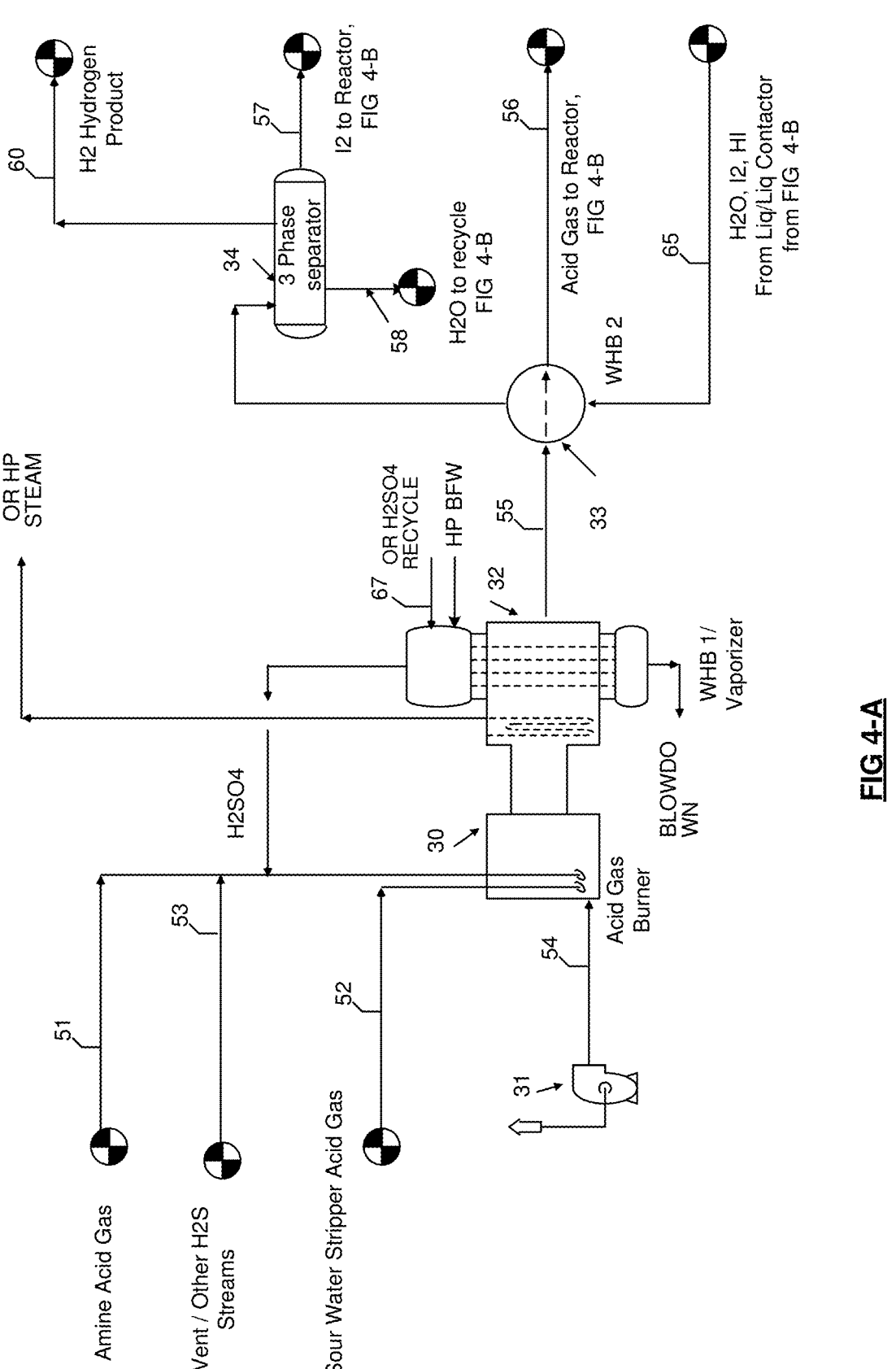
FIG 4-A

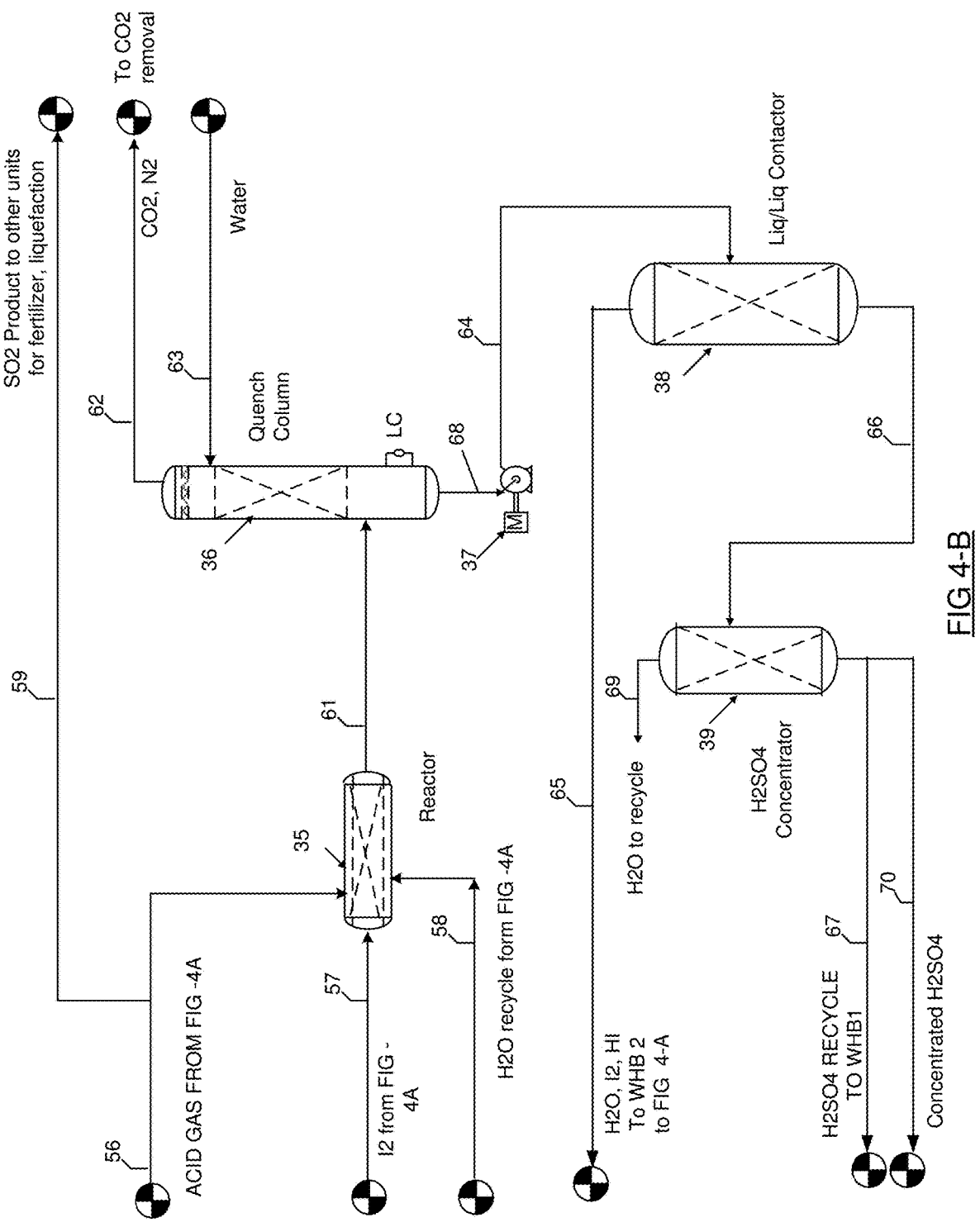
FIG 4-B

INTEGRATED SULFUR RECOVERY AND HYDROGEN PRODUCTION PROCESS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

The present invention relates to the integration of sulfur recovery and hydrogen production, specifically a process for treating acid gas streams containing hydrogen sulfide (H2S), ammonia, and other sulfur compounds, typically processed in Claus sulfur recovery units. Utilizing an acid gas burner and the sulfur-iodine (S—I) thermochemical cycle, the process produces hydrogen (H2), sulfur dioxide (SO2), and sulfuric acid (H2SO4) while eliminating SO2 emissions and significantly reducing carbon dioxide (CO2) emissions.

H2 production, sulfuric acid and SO2 production process refers to an innovative process VIA the phenomena of the Sulfur-Iodine (S-I) thermochemical cycle. The process consist of the acid gas burner to burn all the acid gases with air, enriched air or oxygen and without using any fuel gas to produce SO2.

The present invention objectives are not only to produce hydrogen but also to produce SO2 that is converted to sulfuric acid or fertilizer products or to liquefied SO2 for other SO2 applications.

The other aspects of the present invention is to reduce CO2 emission and de-carbonization compare to prior arts of the commercial sulfur recovery technologies.

The present innovation can be applied to the gas plants, sour gas field developments, refineries, bio-refining, petrochemical plants, IGCC, LNG and any facilities that produce acid gases containing H2S mining operations, smelters, and flue gas desulfurization systems, both onshore and offshore.

In accordance with aspects of the present invention, full streams flow or a portion of one or both gases; amine acid gases and the sour water stripper gases (SWS) are sent to the present innovative technology for processing, which these gas streams are normally processed in the Claus sulfur recovery unit.

In other aspects of this innovation, the SO2 produced in the present invention can also be reacted with the SWS gas to produce ammonium sulfate or ammonium thiosulfate (NH4)2S2O3 as fertilizer products, which reduces the size of the Claus unit and ultimately to reduce or to eliminate SO2 and CO2 emissions.

DESCRIPTION OF THE RELATED ART

Sulfur recovery units, such as Claus plants, are critical for processing acid gases from industrial facilities to recover elemental sulfur. Acid gases, sourced from amine units (e.g., hydrotreaters, coker units, gas plants) and sour water strippers (SWS, phenolic or non-phenolic, one- or two-stage), contain H2S, ammonia, carbonyl sulfide (COS), nitrogen (N2), hydrogen cyanide (HCN), phenol, carbon disulfide (CS2), CO2, water, hydrocarbons, mercaptans, sulfur vapors, and other sulfur compounds. In the Claus process, H2S is partially oxidized with air, enriched air, or oxygen to SO2, ideally maintaining a 2:1 H2S:SO2 ratio, to produce sulfur via the reaction 2H2S+SO2→3S+2H2O. However, variations in acid gas composition, particularly lean H2S streams (low H2S concentration) or high ammonia content, complicate thermal stage control, reducing sulfur recovery efficiency. Unrecovered sulfur compounds are sent to tail gas incinerators, which require substantial fuel gas to achieve combustion temperatures (typically 600° C.-800° C.), producing significant CO2 and, if not treated, SO2 emissions. Tail gas treating units (e.g., caustic scrubbing, SETR processes) consume utilities like steam, cooling water, and refrigeration, increasing operational costs without generating valuable byproducts like hydrogen.

Hydrogen production is essential for refinery operations, particularly hydrotreating, but conventional methods are energy-intensive and environmentally challenging. Natural gas reforming, the predominant method, reacts methane with high-temperature steam (700° C.-1000° C.) to produce synthesis gas (H2, CO, CO2), followed by a water-gas shift reaction (CO+H2O→CO2+H2) to yield additional hydrogen. This process, while efficient, relies on fossil fuels, contributing to CO2 emissions (approximately 9-12 kg CO2/kg H2). Coal or biomass gasification operates similarly but requires pressurized gasifiers and high energy inputs, making it less economical. Electrolysis splits water into H2 and O2 using electricity, ideally from renewable sources (solar, wind), but is costly (5-7 kWh/kg H2) and less scalable for industrial demands. Renewable liquid reforming (e.g., ethanol with steam), biomass fermentation, and high-temperature water splitting (using solar or nuclear heat) are emerging but face economic and technical barriers, such as low yields or high capital costs.

The sulfur-iodine (S—I) thermochemical cycle has been studied as a low-emission hydrogen production method, primarily in nuclear contexts. Research by the U.S. Department of Energy (DOE) includes studies by L. C. Brown (Kentucky University, 2003), Benjamin Russ (DOE, June 2009), and P. Pickard (Sandia National Labs, May 2005), which explored S—I cycles driven by high-temperature nuclear reactor heat (800° C.-1000° C.). These studies focused on pure H2S or streams with minimal impurities, concluding that S—I cycles are efficient for large-scale hydrogen production with non-fossil energy sources, reducing greenhouse gases. However, they do not address the complex, impure acid gas streams from sulfur recovery units, which contain ammonia, hydrocarbons, and other contaminants that cause side reactions and operational instability.

U.S. Pat. No. 11,104,574 B2 (August 2021) describes H2S-mediated water splitting to produce H2 and SO2 via the reaction H2S+2H2O→SO2+3H2. This process lacks an acid gas burner and incineration, limiting its ability to handle real-world acid gases with impurities, which lead to side effects and reduced hydrogen yield. Only one-third of H2S is converted to sulfur, with two-thirds forming SO2, requiring significant heat for decomposition (approximately 1000° C.), making it energy-intensive.

U.S. Pat. No. 4,258,026 (March 1981, O'Keefe) discusses iodine decomposition chemistry but is unrelated to acid gas processing or S—I cycles.

Other prior art, such as nuclear S—I studies, assumes idealized conditions inapplicable to industrial acid gas streams.

All of studies have a common basis and conclusion whereas, refers to a hydrogen economy will need significant new sources of hydrogen. Unless large-scale carbon sequestration can be economically implemented, use of hydrogen reduces greenhouse gases only if the hydrogen is produced with non-fossil energy sources. Nuclear energy is one of the limited options available. One of the promising approaches to produce large quantities of hydrogen from nuclear energy efficiently is the Sulfur-Iodine (S-I) thermochemical water-splitting cycle, driven by high temperature heat from a nuclear reactor.

The study was conducted by Benjamin Russ, Dated June 2009 for the US Department of Energy Nuclear plant, another study was conducted by Kentucky University, L. C. Brown, dated 2003, and the study was conducted by DOE Hydrogen program and Sandia National Labs by P. Pickard, dated May of 2005 using nuclear energy. The present invention refers to the gases are processed in the sulfur recovery units, as known as amine acid gases and sour water stripper gases.

The present invention addresses these deficiencies by integrating sulfur recovery with hydrogen production, using an acid gas burner to combust diverse acid gas streams without fuel gas and the S—I cycle to produce H2, SO2, and H2SO4, while eliminating SO2 emissions and recovering CO2, offering a robust, scalable, and environmentally superior solution.

BRIEF SUMMARY OF THE INVENTION

The present invention provides an integrated process for producing hydrogen, sulfur dioxide, and sulfuric acid from acid gas streams typically processed in Claus sulfur recovery units. By combining an acid gas burner with the sulfur-iodine (S—I) thermochemical cycle, the process combusts acid gases with air, enriched air, or oxygen at 900° C. to 2000° C. without fuel gas, reducing CO2 emissions. Iodine acts as a regenerable catalyst to produce hydrogen at 300° C.-500° C., while SO2 is recovered as a product, converted to sulfuric acid at 100° C.-200° C., or used to produce fertilizers (e.g., ammonium sulfate, ammonium thiosulfate). The process eliminates SO2 emissions by converting all sulfur compounds to SO2, which is fully utilized, and reduces CO2 emissions by avoiding fuel gas and recovering CO2 for liquefaction or reuse. Hydrogen is produced to meet internal facility needs, such as hydrotreaters, reducing external hydrogen imports and operating costs.

OBJECTIVES

Produce H2, SO2, and H2SO4 as valuable products from acid gases, reducing reliance on external hydrogen and sulfuric acid supplies.

Eliminate SO2 emissions and reduce CO2 emissions compared to Claus processes and tail gas incineration.

Process acid gas streams with varying H2 concentrations (lean or rich) and impurities (ammonia, mercaptans, hydrocarbons) without acid gas enrichment, ensuring stable operation.

Minimize energy and utility consumption (fuel gas, cooling water, steam, refrigeration) through efficient heat recovery.

Enable integration with existing Claus units by diverting all or part of acid gas streams, upgrading prior art equipment as needed.

Apply to diverse industrial settings, including refineries, gas plants, sour gas fields, LNG, IGCC, petrochemicals, mining, smelters, and flue gas desulfurization, both onshore and offshore.

Provide robust, reliable operation with automated control systems, tolerating variations in feed composition and operating conditions.

Key Features

Acid Gas Burner: Combusts one to ten acid gas streams at 0.5-10 bar, converting H2S to SO2, ammonia to N2 and water, and other sulfur compounds to SO2 without fuel gas, leveraging high H2S concentrations to achieve stable combustion.

S—I Thermochemical Cycle: Facilitates hydrogen production via iodine-catalyzed reactions, with iodine regenerated and reused, minimizing reagent costs.

Heat Recovery: Utilizes one to ten waste heat boilers (WHBs) or sulfuric acid vaporizers to generate high-pressure steam or recycle H2SO4, reducing utility demands.

Emission Control: Eliminates SO2 emissions by processing all sulfur compounds into SO2, which is converted to H2SO4 or recovered products. Reduces CO2 by eliminating fuel gas and recovering CO2 for liquefaction or reuse.

Product Flexibility: Produces SO2 for liquefaction or fertilizers, H2SO4 for market sale, and H2 for internal use, enhancing economic viability.

Operational Stability: Handles lean or rich H2S streams, ammonia, mercaptans, and hydrocarbons, with staged burner designs and automated controls ensuring compliance with air quality regulations (e.g., <20 ppmv NOx).

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

Figure 1:
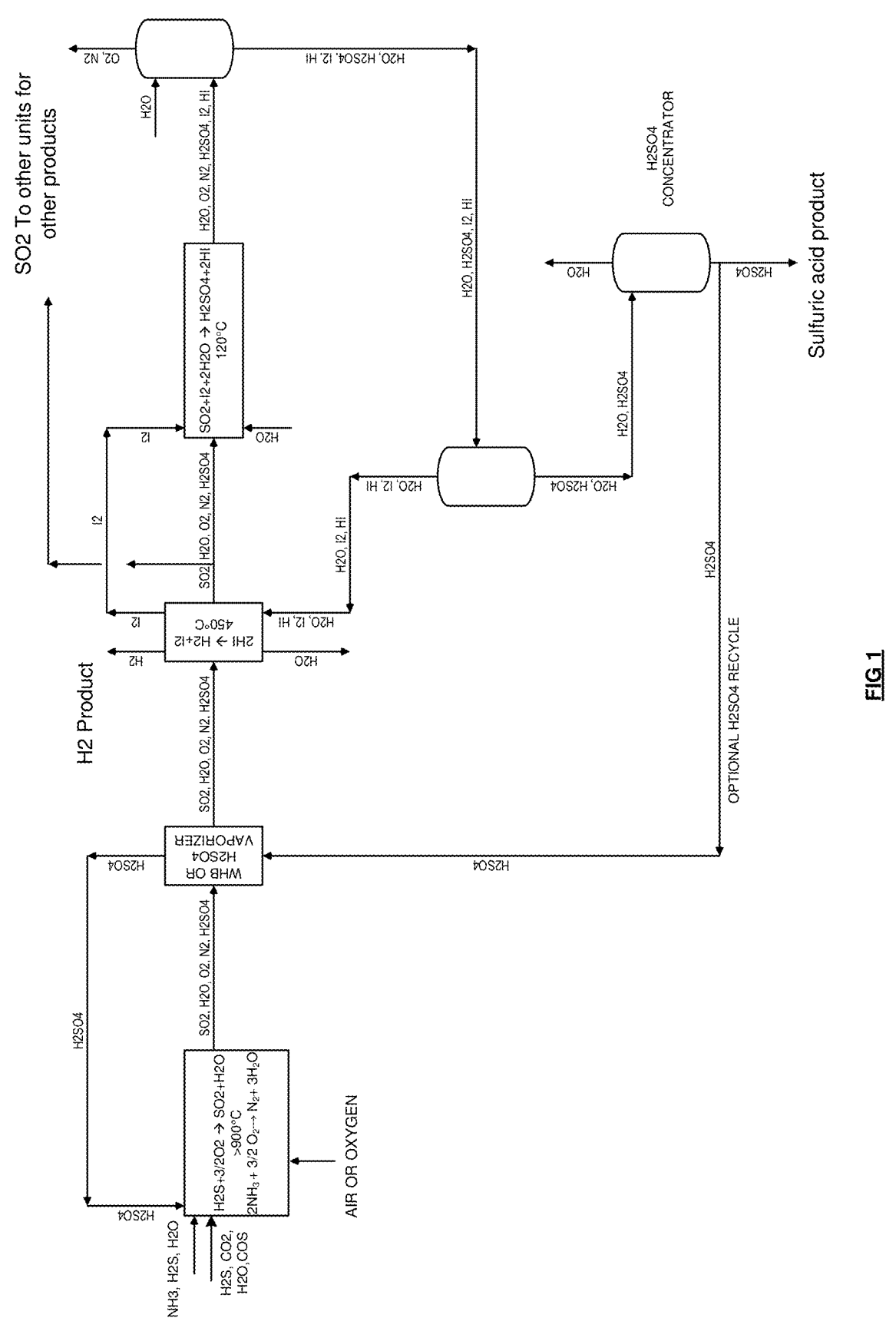

The following drawings, referenced throughout the specification, illustrate the invention and its integration with prior art:

FIG. 1: Block flow diagram depicting major equipment (acid gas burner, waste heat boilers, reactors, three-phase separator, quench column, liquid-liquid contactor, sulfuric acid concentration unit) and chemical reactions (H2S combustion, S—I cycle reactions) of the integrated process.

Figure 2:
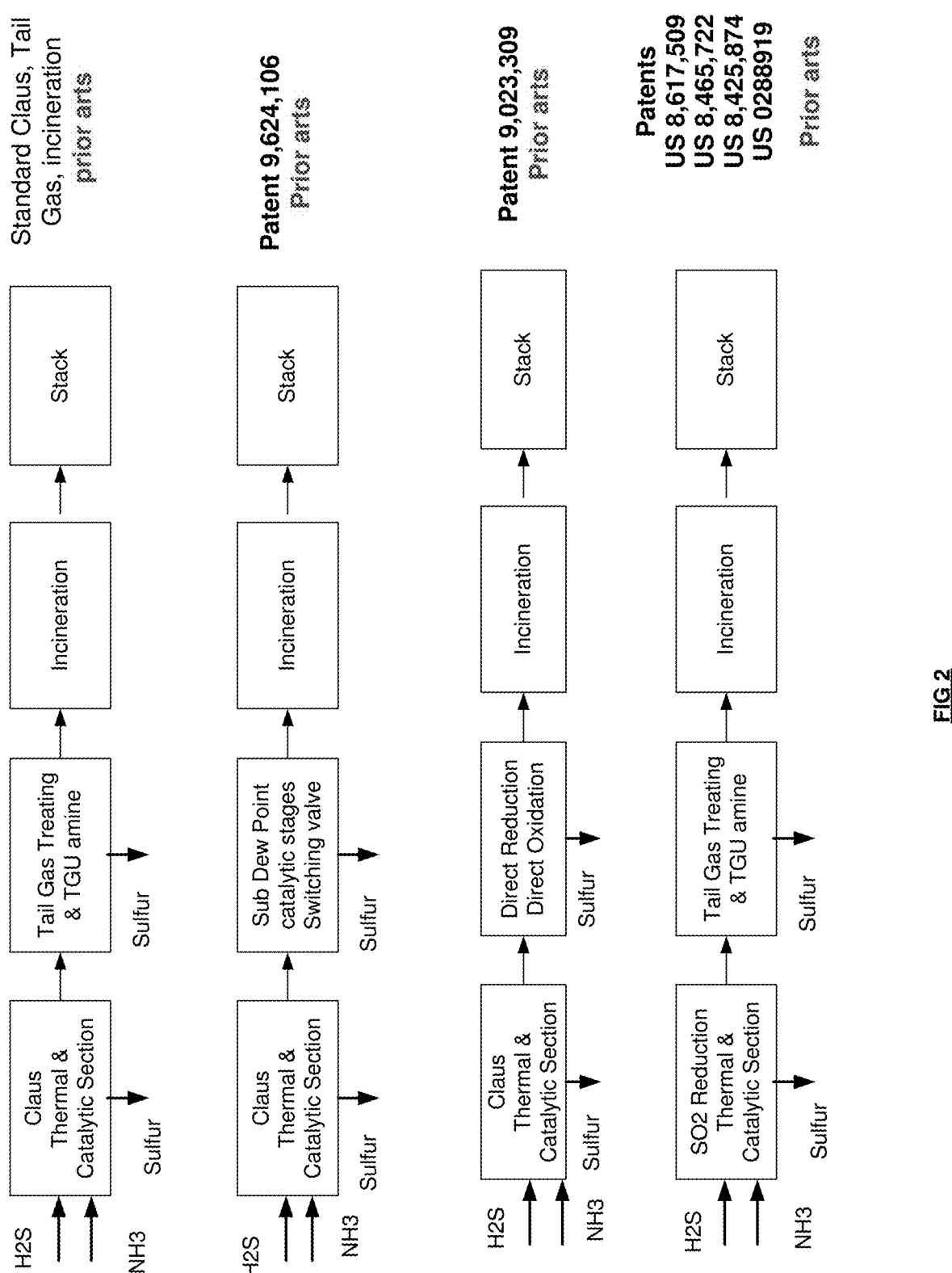

FIG. 2: Diagram of prior art Claus sulfur recovery and tail gas treating units, processing amine acid gases (from hydrotreaters, coker units, gas plants, petrochemicals, IGCC, LNG, mining) and SWS gases (phenolic or non-phenolic, one- or two-stage), with unrecovered sulfur compounds incinerated using fuel gas, emitting CO2 and SO2.

Figure 3:
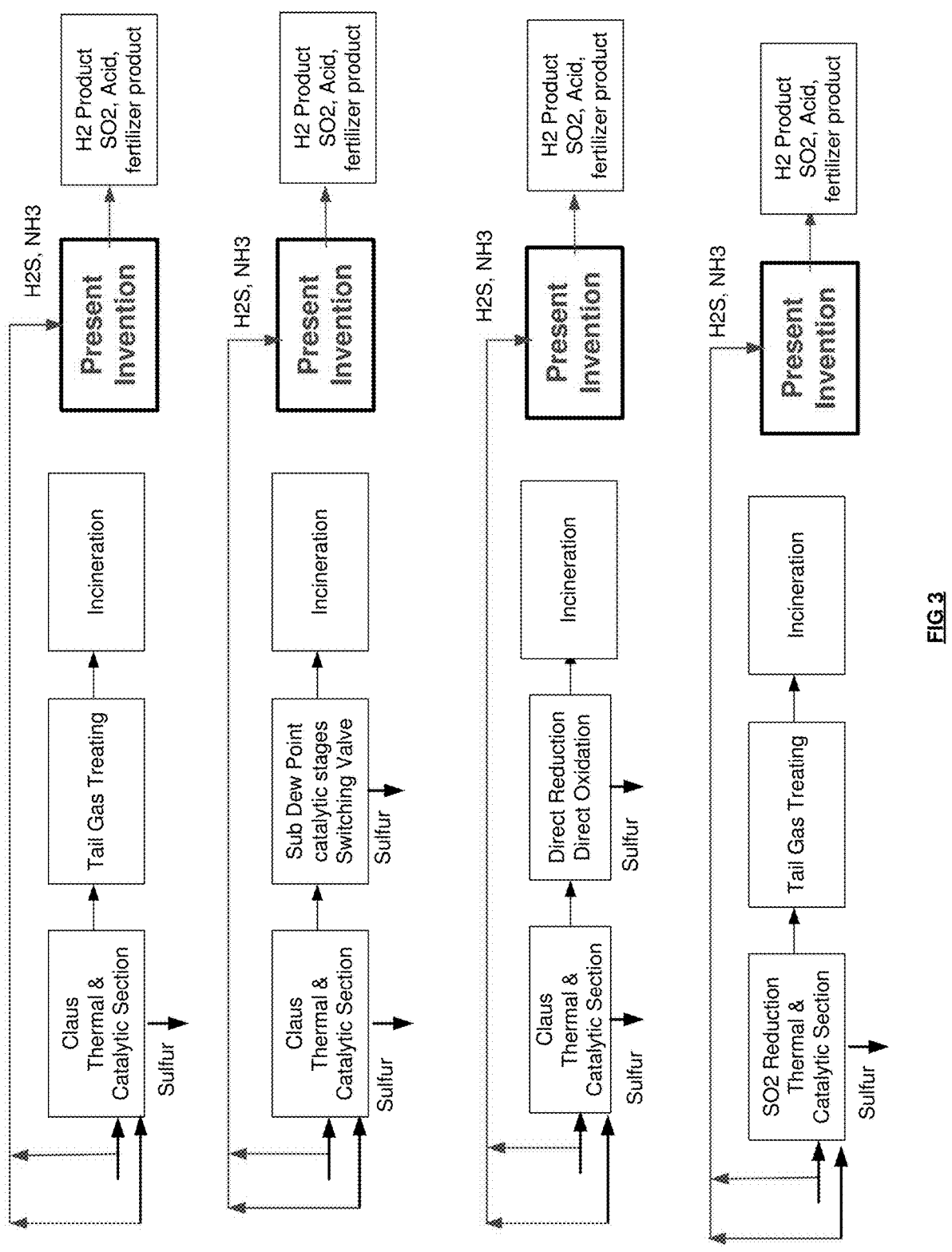

FIG. 3: Diagram showing integration of the present invention with Claus units, diverting all or part of acid gas streams to produce H2, SO2, and H2SO4, reducing fuel gas consumption and emissions while supplying hydrogen for internal needs (e.g., hydrotreaters).

FIGS. 4 (4A and 4B): Detailed process flow diagrams illustrating equipment (burner, WHBs, reactors, separators, quench column, contactor, concentration unit), process streams (acid gas, air, combusted gas, H2, SO2, H2SO4, CO2, recycled I2/HI), and operating conditions (e.g., 900° C.-2000° C. combustion, 120° C. H2SO4 reaction, 450° C. H2 production). FIG. 4A focuses on combustion and hydrogen production; FIG. 4B covers SO2/H2SO4 production and separation.

These drawings are exemplary, not limiting. Variations in equipment design, stream routing, or integration configurations are within the invention's scope, as described below.

DETAILED DESCRIPTION OF THE INVENTION

One or more illustrative embodiments incorporating the invention disclosed herein are presented below. Not all features of an actual implementation are described or shown in this application for the sake of clarity.

It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general, terms, Applicant has created new processes for the hydrogen production with the integration of the sulfur recovery unit.

The present invention relates to processes to produce hydrogen, SO2 and other relevant products to also reduce SO2 and CO2 emission, the new invention applies to onshore and offshore applications; refineries, gas plants, IGCC, gasification, coke oven gas, mining and smelters sour gas field developments and flue gas desulfurization, wherein, the acid gases contain H2S and sulfur compounds.

In accordance with aspects of the present invention, it is an object of the present disclosure to provide a process to produce hydrogen, and SO2 to reduce SO2 and CO2 emission and economically acceptable for, present day industrial operations and higher safety standard.

Another object is to provide such a process, which can tolerate variances in operating conditions within a given range without major equipment adaptations. A further object is to provide a process, which can be utilized in co-acting phases to provide, at acceptable economics, the capacity required in present-day industrial operations, easy to operate and more reliable and robust operation.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions. Finally, the present invention is a polisher to existing arts therefore, the existing arts and their variations scheme of existing arts are discussed where their FEED stream enters the present invention of acid gas burner incineration.

The figures illustrate steam reheaters that heats up the gas by using steam, however, any suitable heat exchanger, using different heating media, or fired reheaters using natural gas or acid gas, and hot gas bypass maybe employed in this service.

The figure illustrates a waste heat boiler that produces steam, however, any suitable heat exchanger, such as a water heater, steam superheater or feed effluent exchanger may be employed in this service.

The acid gas burner incineration may have multiple burner to prevent NOx formation during the ammonia burning with intercooling system between the acid gas burners and with mixing devices, checker wall or choke ring or vector wall to create the turbulent velocity of gas for a better mixing and to prevent cold spot and condensation. In addition, the checker wall near the tube sheet of the waste heat boiler maybe added to protect the tube sheet from the heat radiation from the burner.

In accordance to this invention; the prior arts; sulfur recovery units may be modified to improve the operation wherein, the present innovation is integrated.

Once again, since the prior arts provides feed gas stream to the present invention; The prior arts are upgraded, modified, revamped, and optimized by adding related equipment, adding piping, adding recycle from the present invention, changing the catalysts, adding instrumentation, modified existing equipment to be suitable.

In the prior arts; the last condenser may be modified or replaced as at least one heat exchanger or multiple heat exchangers, dual condensers or combination of water coolers and air coolers to achieve maximum sulfur condensation and sulfur recoveries.

The new invention comprises that SO2 and CO2 emissions reduced significantly, while hydrogen also produced.

All the heat exchangers defined in this process can be of any type of commercial exchangers such as but not limited to fired heaters, shell and tube, plate and frame, air cooler, water cooler, boiler type, or any suitable exchangers.

All required control systems in the prior and new arts are defined based on the latest commercial control systems including but not limited to local panel, DCS control room, burner management systems in the sulfur plant, switching valves sequencer control systems, reactors, condensers, incineration and adsorbers and all necessary equipment in this innovation.

The sequence runs fully automatically without requiring any operator action.

The present invention provides an integrated process for producing hydrogen (H2), sulfur dioxide (SO2), and sulfuric acid (H2SO4) from acid gas streams containing hydrogen sulfide (H2S), ammonia, and other sulfur compounds, typically processed in Claus sulfur recovery units. By combining an acid gas burner with the sulfur-iodine (S—I) thermochemical cycle, the process eliminates the need for fuel gas, reduces CO2 and SO2 emissions, and recovers CO2 for liquefaction or reuse. The invention is applicable to a wide range of industrial facilities, including refineries, gas plants, sour gas field developments, LNG plants, IGCC plants, petrochemical plants, mining operations, smelters, and flue gas desulfurization systems, both onshore and offshore.
Acid Gas Composition and Challenges Acid gas streams, sourced from amine acid gases (e.g., hydrotreaters, coker units, gas plants, petrochemicals) or sour water strippers (phenolic or non-phenolic, one- or two-stage), contain H2S, COS, N2, HCN, phenol, CS2, CO2, water, hydrocarbons, mercaptans, sulfur vapors, ammonia, and other sulfur compounds. Compositions vary widely, from rich H2S streams (>50% H2S) to lean streams (<20% H2S), with impurities like mercaptans or heavy hydrocarbons complicating Claus unit operation. In Claus processes, lean streams lead to unstable combustion, low sulfur recovery (90%-95%), and high SO2/CO2 emissions, as unrecovered sulfur compounds are incinerated with fuel gas. Ammonia-rich streams risk catalyst deactivation or NOx formation, requiring complex controls. The present invention overcomes these challenges by combusting all acid gas components in a high-intensity burner, converting H2S and sulfur compounds to SO2, ammonia to N2 and water, and hydrocarbons to CO2 and water, without fuel gas, ensuring stable operation across all feed compositions.

Process Steps

The process, illustrated in FIGS. 1, 4A, and 4B, comprises the following detailed steps, with equipment and stream designations corresponding to the process flow diagrams:

Acid Gas Combustion (FIG. 4A):

Input: One to ten acid gas streams (streams 51-53, from amine units or SWS) and an air stream (stream 54, from air blower 31) enter the acid gas burner (30) at 0.5 to 10 bar pressure.

Operation: The burner operates at 900° C. to 2000° C. with 100% stoichiometry and 10%-20% excess oxygen, combusting H2S, ammonia, hydrocarbons, and sulfur compounds without fuel gas. High H2S concentrations (even in lean streams) provide sufficient heat for stable combustion, eliminating CO2 emissions from fuel gas. Key reactions include:

$$H_2S+3/2O_2 > SO_2+H_2O \ (\Delta H=-518 \ kJ/mol, 900° \ C.-2000° \ C.).$$

$$2NH_3+3/2O_2 - N_2+3H_2O \ (\Delta H=-317 \ kJ/mol).$$

$$COS+3/2O_2 > SO_2+CO_2.$$

$$CS_2+3O_2 - 2SO_2+CO_2.$$

Output: A combusted gas mixture (stream 55: SO2, CO2, N2, water, oxygen, trace H2SO4 due to partial SO2 oxidation).

Burner Design: Constructed with corrosion-resistant materials (e.g., high-chromium alloys) and advanced refractory lining (alumina-based, 90% Al2O3) to withstand high temperatures and acidic conditions. The burner includes one to ten stages, with intercooling (via WHBs) for ammonia-rich streams to prevent NOx formation (<20 ppmv, per air quality regulations). Mixing devices, such as a choke ring (constricting flow to enhance turbulence), checker wall (baffled ceramic grid), or vector wall, ensure uniform combustion, prevent cold spots, and protect downstream equipment (e.g., WHB tube sheets) from direct radiation. Air, enriched air (20%-40% O2), or pure oxygen may be used, with oxygen enrichment reducing N2 content and enhancing combustion efficiency.

Residence Time: 1-2 seconds to ensure complete combustion of HCN, phenol, and sulfur vapors.

Heat Recovery (FIG. 4A):

First Stage: The combusted gas (stream 55, ~1200° C.) enters the first waste heat boiler (WHB 1, 32), cooling to 300° C.-400° C. while generating high-pressure steam (40-60 bar, 10-20 t/h for a 1000 Nm³/h feed). Alternatively, a sulfuric acid vaporizer vaporizes a slipstream of H2SO4 (stream 67, 1%-5% of H2SO4 product), which is recycled to the burner to enhance SO2 yield.

Second Stage: The cooled gas enters the tube side of a second WHB (WHB 2, 33), further cooling to 150° C.-200° C. One to ten commercial heat exchangers (shell-and-tube, plate-and-frame, water heaters, steam super-heaters, or feed-effluent exchangers) may be used, with materials like stainless steel (316L) or Hastelloy for corrosion resistance.

Energy Efficiency: Heat recovery reduces cooling water and steam demands by 20%-30% compared to Claus units, with steam used for process heating or power generation.

Hydrogen Production (FIG. 4A):

Input: On the shell side of WHB 2 (33), iodine (I2), hydroiodic acid (HI), and water (stream 65) are introduced, heating to 300° C.-500° C. (preferably 450° C.).

Reaction: The reaction 2HI→H2+I2 (ΔH=+12 kJ/mol) occurs, producing hydrogen. Excess iodine ensures efficient HI decomposition, as iodine is a critical solvent in the S—I cycle.

Separation: The three-phase mixture (H2, I2, water) enters a three-phase separator, separating:

Hydrogen (stream 60, product, 99.9% purity, 100-500 kg/h for a 1000 Nm³/h feed).

Water (stream 58, recycled to reactor 35).

Iodine (stream 57, recycled to reactor 35).

Iodine Recycling: Iodine is regenerated via the S—I cycle, with losses<0.1% per cycle, minimizing reagent costs. The separator operates at 2-5 bar, with stainless steel internals to resist iodine corrosion.

SO2 and H2SO4 Production (FIG. 4B):

Input: The cooled combusted gas (stream 56: SO2, O2, N2, water, trace H2SO4) from WHB 2 has two pathways:

Option 1: A portion (0%-50%) is sent to secondary units for SO2 liquefaction (99.5% purity, 500-1000 kg/h) or fertilizer production (e.g., ammonium sulfate via SO2+2NH3+H2O→(NH4)2SO4, or ammonium thiosulfate via SO2+S+2NH3→(NH4)2S2O3), reducing Claus unit load and emissions.

Option 2: The full or remaining stream, with recycled water (stream 58) and iodine (stream 57), enters a reactor (35) at 100° C.-200° C. (preferably 120° C.).

Reaction: In reactor 35, the reaction SO2+I2+2H2O→H2SO4+2HI (ΔH=−187 kJ/mol) produces sulfuric acid and hydroiodic acid. Excess water (5:1 molar ratio to SO2) and iodine (2:1 molar ratio to SO2) ensure complete reaction and phase separation.

Reactor Design: Operates at 2-5 bar, with titanium or glass-lined materials to resist H2SO4 corrosion. Residence time is 10-20 seconds.

Gas and Liquid Separation (FIG. 4B):

Quench Column: The reactor outlet (stream 61: H2SO4, HI, I2, water, N2, CO2) enters a quench column (36) with high-performance trays (e.g., sieve trays, 10-20 stages) or structured packing (e.g., Mellapak, 2-3 m height), cooled by air or water (20° C.-40° C., not shown). N2 and CO2 (stream 62, 200-500 kg/h) are separated and sent to a CO2 liquefaction unit (99% purity) or CO2 removal system (e.g., amine absorption).

Liquid-Liquid Contactor: The bottom liquid (stream 64: H2SO4, water, I2, HI) flows to a liquid-liquid contactor (38) with similar internals (10-15 trays or 1-2 m packing). Excess iodine forms two immiscible phases: a light H2SO4/H2O phase (stream 66) and a heavy HI/I2/H2O phase (stream 65, recycled to WHB 2). Separation efficiency is >95%, with H2SO4 purity of 70%-80% pre-concentration.

Materials: Both units use corrosion-resistant materials (e.g., Teflon-lined steel, Hastelloy) to handle acidic and iodine-containing streams.

Sulfuric Acid Concentration (FIG. 4B):

Input: The $H_2SO_4$ stream (66) enters a concentration unit (39), typically a distillation column with a steam reboiler (150° C.-200° C., 4-6 bar steam).

Operation: Water is removed (stream 69, recycled or treated), concentrating $H_2SO_4$ to market-grade purity (stream 70, 98%-99%, 1000-2000 kg/h).

Design: Includes 5-10 trays or 1-2 m packing, with graphite or tantalum heat exchangers to resist corrosion. Energy consumption is 0.5-1 GJ/t $H_2SO_4$.

Chemical Reactions and Thermodynamics

The S—I thermochemical cycle drives the process, with reactions optimized for industrial acid gas streams:

Combustion: $H_2S+3/2O_2 \rightarrow SO_2+H_2O$ (900° C.-2000° C., exothermic, $\Delta H=-518$ kJ/mol). Ensures complete conversion of sulfur compounds (COS, $CS_2$, mercaptans, sulfur vapors) to $SO_2$.

$H_2SO_4$ Formation: $2H_2O+SO_2+I_2 \rightarrow H_2SO_4+2HI$ (120° C., exothermic, $\Delta H=-187$ kJ/mol). Excess water and iodine drive equilibrium to the right.

$H_2$ Production: $2HI \rightarrow H_2+I_2$ (450° C., endothermic, $\Delta H=+12$ kJ/mol). High temperature and iodine recycling ensure efficient hydrogen yield.

Overall: $H_2S+3/2O_2+H_2O \rightarrow H_2+H_2SO_4$ (net exothermic, $\Delta H \approx -693$ kJ/mol).

Sulfuric acid and hydroiodic acid are separated using excess iodine, forming immiscible phases (light $H_2SO_4/H_2O$, heavy $HI/I_2/H_2O$), avoiding thermal decomposition and enabling cost-effective hydrogen production. The cycle's closed-loop iodine use minimizes reagent costs (<$0.01/kg $H_2$).

Equipment Specifications

Acid Gas Burner (30):

Materials: High-chromium alloys (e.g., Inconel 625) with 90% $Al_2O_3$ refractory lining (2-3 cm thick) to withstand 2000° C. and acidic gases (pH<2).

Configuration: One to ten burners, each 0.5-2 m diameter, with staged combustion for ammonia-rich streams ($NH_3$>10%). Intercooling via WHBs maintains temperatures below 1400° C. to limit NOx (<20 ppmv).

Mixing Devices: Choke ring (50%-70% diameter reduction), checker wall (ceramic grid, 10-20 cm spacing), or vector wall (30°-45° vanes) ensure turbulent flow (Reynolds number>10,000) and protect WHB tube sheets.

Oxygen Supply: Air (21% $O_2$), enriched air (20%-40% $O_2$), or pure oxygen (95%-100%), with flow rates of 1.5-2 mol $O_2$/mol $H_2S$.

Waste Heat Boilers (32, 33):

Types: Shell-and-tube (U-tube, 316L stainless steel), plate-and-frame, water heaters, steam super-heaters, or feed-effluent exchangers. WHB 1 may include a sulfuric acid vaporizer (1-5 t/h $H_2SO_4$).

Capacity: One to ten units, each handling 500-5000 $Nm^3$/h gas, producing 5-20 t/h steam (40-60 bar).

Corrosion Protection: Ferritic stainless steel or Hastelloy tubes, with ceramic coatings on tube sheets.

Reactors and Separators (35, Three-Phase Separator, 36, 38):

Reactor 35: Titanium or glass-lined, 2-5 $m^3$, 2-5 bar, 120° C., with agitators for uniform mixing.

Three-Phase Separator: Stainless steel (316L), 1-3 $m^3$, with demister pads for gas-liquid separation.

Quench Column (36): 2-5 m diameter, 10-20 sieve trays or 2-3 m Mellapak packing, cooled to 20° C.-40° C.

Liquid-Liquid Contactor (38): 1-3 m diameter, 10-15 valve trays or 1-2 m structured packing, with Teflon or Hastelloy internals.

Concentration Unit (39):

Design: Distillation column, 5-10 trays, graphite reboiler (150° C.-200° C.), producing 98%-99% $H_2SO_4$.

Energy: 0.5-1 GJ/t $H_2SO_4$, with steam recycle to process heating.

Control Systems:

Automation: Distributed control systems (DCS), burner management systems (BMS, SIL-3 rated), and sequencer controls for reactors, condensers, and separators.

Operation: Fully automatic, with real-time monitoring of temperature (thermocouples, ±1° C. accuracy), pressure (transducers, ±0.1 bar), and composition (gas chromatographs, ±0.5% accuracy). Switching valves operate via programmable logic controllers (PLCs).

Safety: Emergency shutdown systems and flame detectors ensure compliance with OSHA and EPA standards.

Integration with Prior Art

As shown in FIG. 3, the process integrates with existing Claus sulfur recovery units (FIG. 2) by diverting all or part of amine acid gas and SWS gas streams to the acid gas burner. Modifications to prior art units include:

Piping and Recycle: Adding pipelines for acid gas diversion (carbon steel, 4-12 inch diameter) and $H_2SO_4$ recycle (stream 67, Teflon-lined).

Condensers: Replacing final Claus condensers with dual condensers (water-cooled, 20° C. outlet) or air/water coolers (50-100 $m^2$ surface area) to maximize sulfur recovery (>98%) before feeding the present invention.

Catalysts: Upgrading Claus catalysts (e.g., activated alumina to CoMo-based) to handle lean $H_2S$ streams in hybrid configurations.

Instrumentation: Adding flow meters (orifice, ±1% accuracy), analyzers ($SO_2/H_2S$, ±0.2%), and BMS for burner integration.

Equipment Modifications: Retrofitting Claus burners with oxygen enrichment nozzles or refractory linings to support partial integration.

This integration reduces Claus unit load by 20%-100%, eliminates tail gas incineration fuel (saving 1-5 t/h natural gas), and lowers emissions, while producing $H_2$ for internal use, reducing external hydrogen costs by $0.5M-$2M/year for a 500 t/d sulfur plant.

Advantages

Hydrogen Production: Yields 100-500 kg/h $H_2$ (99.9% purity), supplying 50%-100% of hydrotreater needs, saving $0.5M-$2M/year in import costs.

Emission Reduction: Eliminates $SO_2$ emissions (100% sulfur compound conversion to $SO_2$, then $H_2SO_4$/products). Reduces $CO_2$ by 30%-50% (0.5-2 t/h) by avoiding fuel gas and recovering $CO_2$ (200-500 kg/h, 99% purity).

Product Flexibility: Produces $SO_2$ (500-1000 kg/h, 99.5% purity) for liquefaction or fertilizers (1-3 t/h ammonium sulfate/thiosulfate) and $H_2SO_4$ (1000-2000 kg/h, 98%-99% purity) for market sale ($50-$100/t).

Operational Robustness: Processes lean $H_2S$ (<20%), rich $H_2S$ (>50%), ammonia (>10%), and impurities (mercaptans, HCN, phenol) without enrichment, achieving>99% sulfur compound conversion.

Energy Efficiency: Recovers 5-20 t/h steam, reducing cooling water (by 100-500 m³/h), steam (by 1-5 t/h), and refrigeration (by 0.5-2 MW) compared to Claus units.

Scalability: Handles 500-5000 Nm³/h acid gas, applicable to small refineries (100 t/d sulfur) to large gas plants (1000 t/d sulfur).

Example Implementation

A refinery processes 1000 Nm³/h amine acid gas (60% H2S, 20% CO2, 10% hydrocarbons, 10% water) and 500 Nm³/h SWS gas (50% H2S, 40% NH3, 10% water). The acid gas burner (30, two-stage, Inconel 625) combusts the streams at 1200° C. with enriched air (30% O2, 2 mol O2/mol H2S), producing stream 55 (SO2, CO2, N2, water, 0.5% H2SO4). WHB 1 (32) generates 12 t/h steam (50 bar), and WHB 2 (33) cools the gas to 180° C. On WHB 2's shell side, I2, HI, and water (stream 65) react at 450° C., yielding 250 kg/h H2 (stream 60). The three-phase separator recycles I2 (stream 57) and water (stream 58). Stream 56 splits: 30% (150 kg/h SO2) is liquefied (99.5% purity), and 70% reacts in reactor 35 (120° C.) to produce 1800 kg/h H2SO4 and HI. The quench column (36) separates 350 kg/h CO2 (stream 62, liquefied), and the contactor (38) recycles I2/HI (stream 65). The concentration unit (39) yields 98% H2SO4 (stream 70). The process reduces CO2 emissions by 45% (1 t/h vs. Claus incineration), eliminates SO2 emissions, and supplies 70% of hydrotreater H2, saving $1.2M/year.

Comparison with Prior Art

Claus Process: Requires fuel gas (1-5 t/h) for tail gas incineration, emitting 0.5-2 t/h CO2 and 0.1-0.5 t/h SO2. Achieves 90%-95% sulfur recovery for lean H2S, with high utility costs (10-20 MW cooling water, 2-5 t/h steam). The present invention eliminates fuel, achieves>99% sulfur compound conversion, and produces H2, SO2, and H2SO4.

U.S. Pat. No. 11,104,574 B2: Lacks an acid gas burner, struggles with impurities (ammonia, hydrocarbons), and yields low H2 (⅓ H2S to sulfur, ⅔ to SO2). Requires 1000° C. decomposition, consuming 2-3 GJ/t H2. The present invention uses a burner for stable combustion and S—I cycle for efficient H2 production (0.5-1 GJ/t H2).

Nuclear S—I Studies (DOE, 2003-2009): Assume pure H2S and nuclear heat (800° C.-1000° C.), inapplicable to industrial acid gases with ammonia or hydrocarbons. The present invention processes real-world streams, uses existing heat sources, and integrates with Claus units.

Hydrogen Production: Natural gas reforming emits 9-12 kg CO2/kg H2 and costs $1.5-$2/kg H2. Electrolysis costs $3-$5/kg H2 with renewable energy. The present invention produces H2 at $0.5-$1/kg (including byproducts), with near-zero emissions.

CONCLUSION

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention.

Additionally, it will be apparent that certain agents which, are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

The embodiments described are illustrative, not exhaustive. Variations in equipment (e.g., exchanger types, burner configurations), stream routing, or integration with prior art (e.g., modified Claus condensers) may be implemented without departing from the invention's scope. All equivalent processes, apparatuses, and applications, including retrofits to existing sulfur recovery units, are intended to be covered by the claims, to the fullest extent permitted by patent law.

We claim:

1. A process for producing hydrogen, sulfur dioxide, and sulfuric acid from acid gas streams, comprising:
   (a) combusting an acid gas stream comprising hydrogen sulfide and ammonia, sourced from amine acid gas or sour water stripping, in an acid gas burner with an oxygen-containing gas and without fuel gas, to produce a combusted gas mixture comprising sulfur dioxide, carbon dioxide, nitrogen, water, oxygen, and sulfuric acid at a temperature of 900° C. to 2000° C.;
   (b) cooling the combusted gas mixture in a waste heat boiler to generate high-pressure steam or in a sulfuric acid vaporizer exchanger to recover heat and vaporize a portion of sulfuric acid;
   (c) further cooling and quenching the combusted gas mixture in a heat exchanger, wherein iodine, hydroiodic acid, and water are introduced to produce a reaction mixture;
   (d) reacting the reaction mixture in a reactor to produce hydrogen and iodine, and separating the hydrogen, water, and iodine in a three-phase separator, wherein the separated water is recycled and the hydrogen is collected as a product;
   (e) processing the cooled combusted gas mixture from step (c) by: (i) directing a first portion of the cooled combusted gas mixture to a secondary unit for sulfur dioxide liquefaction or production of other products; or (ii) reacting a second portion of the cooled combusted gas mixture with iodine and recycled water from step (d) in a second reactor at 100° C. to 200° C. to produce sulfuric acid and hydroiodic acid;
   (f) separating nitrogen and carbon dioxide from the reaction products of step (e)(ii) in a quench column, and directing a bottom stream comprising sulfuric acid, water, iodine, and hydroiodic acid to a liquid-liquid contactor to separate sulfuric acid from iodine and hydroiodic acid, wherein the iodine and hydroiodic acid are recycled to step (c);
   and (g) concentrating the separated sulfuric acid in a concentration unit using a steam reboiler to produce concentrated sulfuric acid as a product; wherein iodine is regenerated and reused as a catalyst, and the process reduces sulfur dioxide and carbon dioxide emissions by recovering carbon dioxide for further processing.

2. The process of claim 1, wherein, the acid gas stream comprises at least one of hydrogen sulfide, carbonyl sulfide, nitrogen, hydrogen cyanide, phenol, carbon disulfide, carbon dioxide, water, hydrocarbons, mercaptans, sulfur vapors, or ammonia.

3. The process of claim 1, wherein the acid gas burner processes acid gas streams containing hydrogen sulfide, ammonia, mercaptans, or sulfur compounds at any concentration without requiring an acid gas enrichment unit.

4. The process of claim 1, wherein the acid gas burner comprises one to ten staged burners configured to combust the acid gas stream and cool the combusted gas between stages to prevent nitrogen oxide formation.

5. The process of claim 1, wherein the oxygen-containing gas comprises air, enriched air, or pure oxygen.

6. The process of claim 1, wherein the acid gas burner includes a refractory lining and at least one of a choke ring, checker wall, or vector wall to protect downstream equipment from direct radiation.

7. The process of claim 1, wherein the acid gas stream is supplied at a pressure of 0.5 bar to 10 bar.

8. The process of claim 1 to produce hydrogen occurs at a temperature of 300° C. to 500° C.

9. The process of claim 1, wherein the acid gas stream originates from at least one of refining, gas plants, sour gas field developments, liquefied natural gas production, integrated gasification combined cycle plants, power plants, mining, smelters, or petrochemical facilities.

10. The process of claim 1, wherein a slipstream of the produced sulfuric acid is recycled to the acid gas burner through the sulfuric acid vaporizer.

11. The process of claim 1, wherein the acid gas stream comprises one to ten distinct acid gas streams fed to the acid gas burner.

12. The process of claim 1, wherein the waste heat boiler or sulfuric acid vaporizer exchanger comprises one to ten commercial waste heat boilers, condensers, or heat exchangers configured to recover heat from the combusted gas mixture.

13. The process of claim 1, wherein the reaction in step (e)(ii) to produce sulfuric acid and hydroiodic acid occurs at a preferred temperature of 120° C.

14. The process of claim 1, wherein the quench column includes high-performance trays or packing to enhance separation of nitrogen and carbon dioxide from the reaction products.

15. The process of claim 1, wherein the liquid-liquid contactor includes high-performance trays or packing to separate sulfuric acid from iodine and hydroiodic acid.

16. The process of claim 1, wherein the concentrated sulfuric acid produced in step (g) achieves a purity suitable for market-grade sulfuric acid.

17. The process of claim 1, wherein the carbon dioxide separated in step (f) is directed to a carbon dioxide liquefaction unit or a carbon dioxide recovery unit.

18. The process of claim 1, wherein the sulfur dioxide directed to the secondary unit in step (e)(i) is used to produce a fertilizer or other chemical products.

19. The process of claim 1, wherein the acid gas burner is constructed with materials resistant to high-temperature corrosion and equipped with advanced refractory lining to withstand operating temperatures.

20. The process of claim 1, wherein the acid gas stream includes sulfur compounds from hydrotreater units, coker units, or sour water strippers, including phenolic or non-phenolic systems.

\* \* \* \* \*